Aug. 18, 1925.

F. VAN D. LONGACRE 1,550,376

VALVE

Filed May 24, 1924    2 Sheets-Sheet 1

INVENTOR
Frederick v. D. Longacre
BY
Herbert G. Ogden
HIS ATTORNEY

Aug. 18, 1925.
F. VAN D. LONGACRE
1,550,376
VALVE
Filed May 24, 1924     2 Sheets-Sheet 2
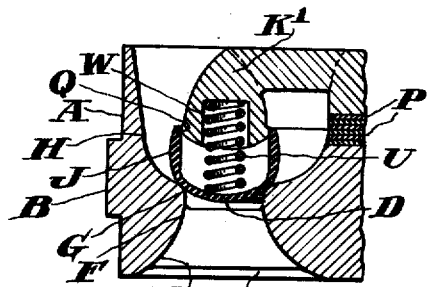
Fig. 6.
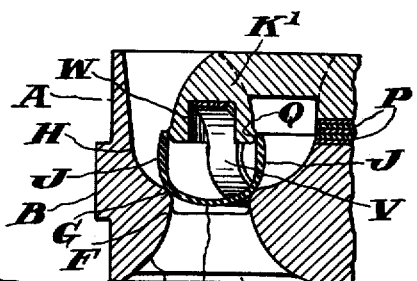
Fig. 7.
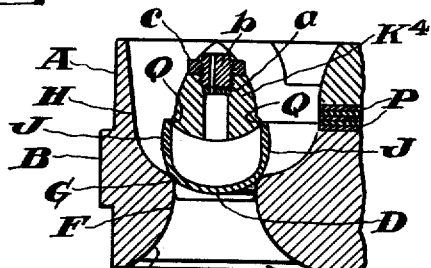
Fig. 9.
Fig. 8.
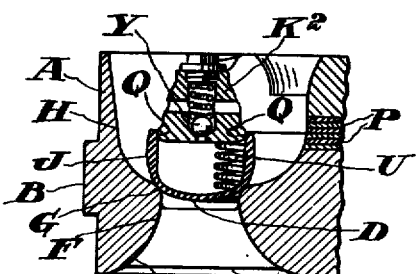
Fig. 10.
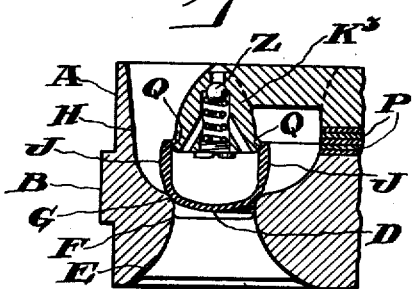
Fig. 11.
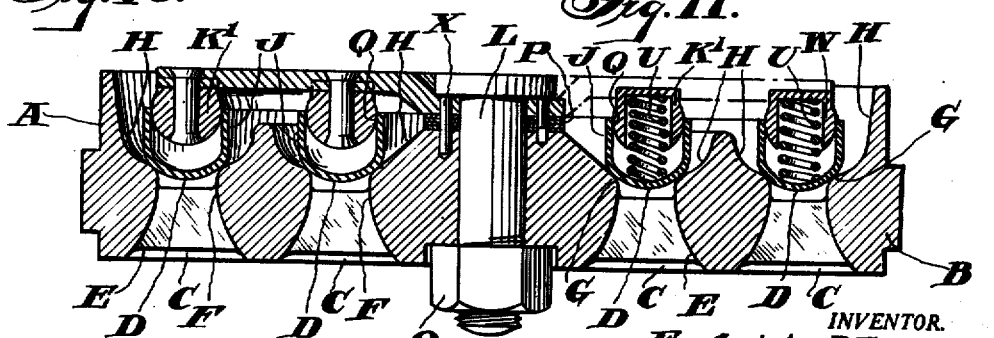
Fig. 12.
INVENTOR.
Frederick v. D. Longacre
BY Herbert G. Ogden
HIS ATTORNEY Patented Aug. 18, 1925.

1,550,376

UNITED STATES PATENT OFFICE.

FREDERICK VAN DUZER LONGACRE, OF YONKERS, NEW YORK, ASSIGNOR TO INGERSOLL-RAND COMPANY, OF JERSEY CITY, NEW JERSEY, A CORPORATION OF NEW JERSEY.

VALVE.

Application filed May 24, 1924. Serial No. 715,551.

*To all whom it may concern:*

Be it known that I, FREDERICK VAN DUZER LONGACRE, a citizen of the United States, and a resident of Yonkers, county of Westchester, and State of New York, have invented a certain Valve, of which the following is a specification accompanied by drawings.

This invention relates to inlet and discharge valves of compressors, pumps and the like for expansive or non-expansive fluids, but more particularly to valves of the annular plate type having multiple ports or passages for the fluid.

The lift at which light weight plate valves of any shape can be commercially operated at various speeds, is primarily dependent upon the shock that they can successfully sustain in opening and closing under any particular conditions of speed and pressure differential. The shock of opening can be practically eliminated or at least somewhat reduced by the use of springs against which the valve is opened, and as these springs can be varied in strength for different conditions, the total opening or lift permissible is less greatly restricted by considerations of shock on opening. The greater the lift however, the greater the shock on closing, and if increased lift is obtained by cushioning the lift, durable valve operation can only be obtained in proportion to the extent that the valve can be cushioned on closing, since the shock of closing is then the limiting destructive element.

The action described obtains with all valves, particularly valves of the plate type, and one of the objects of this invention is to cushion the valve both on opening and closing by means of a fluid cushion, with which a spring cushion may or may not be used, as desired, thus materially reducing the shock of opening and closing with a consequent ability to increase the durable lift of the valve and the width of the entrance ports controlled by the valve.

The fluid cushion for the valve may be obtained in different ways, but one preferable way is to provide a fluid cushion pocket between the valve and its stop plate, which also materially increases the cushioning of the springs on opening, if springs are used. In consequence of the leakage from the cushion pocket on opening, a reduction in the fluid cushion takes place on closing to a point at which the pressure in the cushion pocket falls below the external pressure, thus producing a negative cushion, as it may be termed, against which the valve must close.

Another object of the invention is to reduce the shock and aid the cushioning of the valve by increasing the co-efficient of flow through the valve by proper shaping of the entrance and exit ports, and the throat of the valve structure, in order to reduce internal air friction and the formation of eddy currents to a minimum, and produce as nearly as possible parallel stream flow. In valves usually employed, serious disadvantages arise due to the restricted flow through sharp edged valve openings, either through the seat or the lift, or through the valve plate and between valve plates occurring in series. The proper shaping or contouring of the elements of the valve provides means for changing from pressure to velocity on entrance with a minimum pressure drop, and again changing back from velocity to pressure on exit with a minimum pressure loss.

A valve disclosing some of the principles of flow upon which a part of the present invention is based, is shown in United States Patent No. 1,354,318, granted to me September 28, 1920, but I have improved upon that valve in the respects hereinafter more fully described and pointed out in the claims appended hereto.

With the usual type of plate valve having sharp edged valve openings or otherwise having restricted flow, the average co-efficient of flow varies through a substantially wide range, but is limited to a maximum of about 85%, more or less, as the case may be, which is about the proportion of full opening obtainable for flow as an adiabatic nozzle. The present invention contemplates as near an approach as possible to the ideal co-efficient of flow of a true adiabatic nozzle, which varies from about 97% to about 98%.

In accordance with the present invention, the entrance port through the valve seat is designed to approach the contour of an adiabatic nozzle, having rounded contours at the minimum throat so shaped as to produce a continuation of the stream line flow through the throat or lift area of the valve. The fluid should then pass in substantially parallel streams by both sides of the throat at an even velocity throughout any unit section. After passing through the throat, the fluid enters the exit passage or nozzle, which is so shaped as to produce a proper nozzle construction for the retransformation from high velocity at the throat, back into pressure at the final exit, with minimum pressure loss. The entire flow of the fluid, as air, through the valve approaches the flow obtained in a Venturi tube, the principles of operation of which are well understood, and the valve construction and operation of the present invention may be considered as an interrupted Venturi tube, that is, a Venturi tube in which the flow is rapidly and intermittently interrupted by the opening and closing of the valve.

There is, therefore, an additional effect producing a cushioning action on the valve, due to the increase in velocity of the fluid when passing through the throat and consequent pressure reduction at this point similar to that found in a Venturi tube, so that the valve will lift to a point at which it will float with minimum resistance to the passage of fluid. Because of the reduction of pressure at the throat, any further tendency of the valve to open wider will be overbalanced by external pressure.

Further objects of the invention will hereinafter appear, and the invention can best be further described and explained by reference to the accompanying drawings, showing a preferred form of the invention, in which drawings, Figure 1 is a transverse sectional elevation of a valve and valve structure, showing the valve closed;

Figures 6 and 7 are detail transverse sectional views through a portion of the valve structure showing different forms of springs;

Figure 8 is a detail side view of another form of spring;

Figure 9 is a detail transverse sectional view showing a variable leak port for the cushion pocket;

Figure 10 is a similar view showing a leak port having an outwardly opening relief valve, Figure 11 is a similar view showing a leak port having an inwardly opening relief valve, and Figure 12 is a view similar to Figure 1 showing a plurality of valve members.

Figure 1:
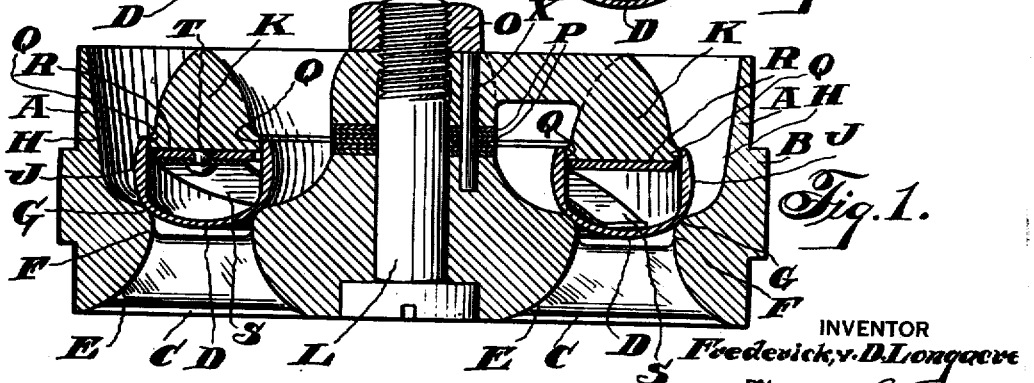

Referring to the drawings, the valve comprises a valve seat A having the flange B to enable the structure to be inserted in a compressor or pump for use either as an inlet or a discharge valve. The simplest form of valve structure is shown in Figure 1 in which there is but one annular port C in the valve seat and a single ring valve D cooperating with the seat, while Figure 12 shows a multiple valve having two rings. The contour of the port C, from the entrance E, through the minimum throat F to the lift area G and the contour of the exit portion H of the passage in the seat beyond the valve is such that stream line flow of the fluid is obtained, without sharp edges or corners in the line of flow.

The valve D itself cooperating with the port C is in the form of a ring, which may be formed of sheet metal, and is cup shaped, with a rounded bottom and sides J preferably having substantially parallel internal faces, adapted to slide over the guide ring or stop plate K secured to the seat A as by means of the bolt L and nut O. Washers P may be inserted between the guide ring and the seat to adjust the distance between the guide ring and the seat to vary the maximum permissible lift of the valve. The contours of the valve D and the guide ring K are such as to produce stream line flow of the fluid in conjunction with the contour of the seat A. The guide ring K is preferably formed with external and internal flanges Q fitting loosely within the valve D, so that small clearance is provided between the guide ring and valve, sufficient to permit some leakage between the two as the valve moves relative to the guide ring. Furthermore this leakage prevents binding of the valve and insures free movement of the valve on the guide ring. A dowel pin X serves to center all the parts.

Figure 5:
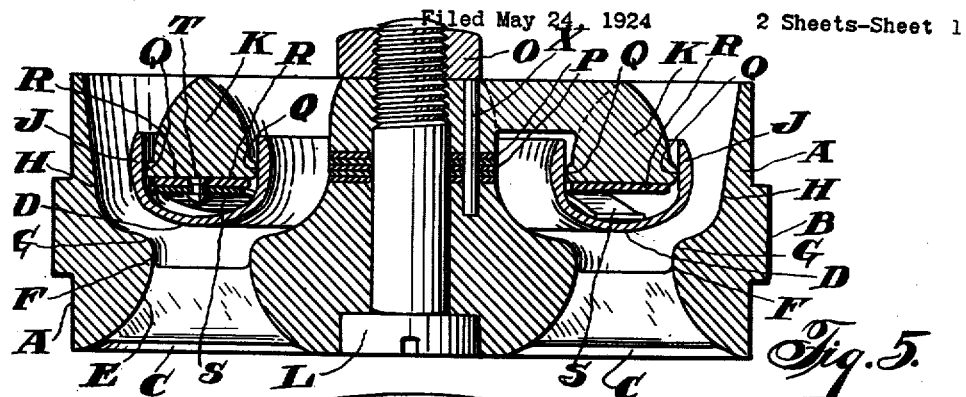
Figure 5 is a view similar to Figure 1 with the valve open.
Figure 4:
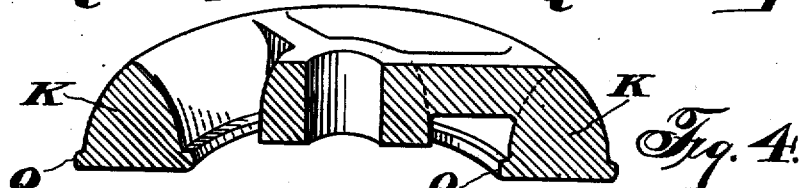
Figure 4 is a perspective view of the guide ring partly in transverse section.
Figure 3:
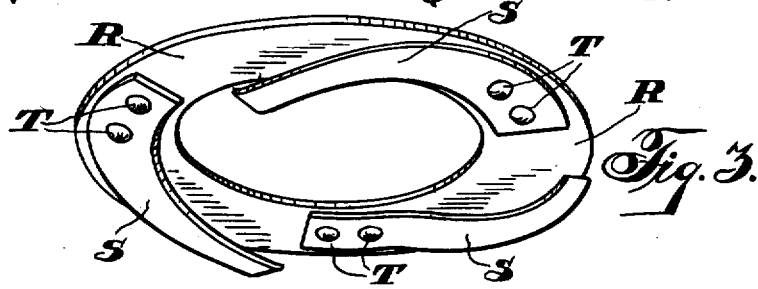
Figure 3 is a perspective view of a form of valve spring.
Figure 2:
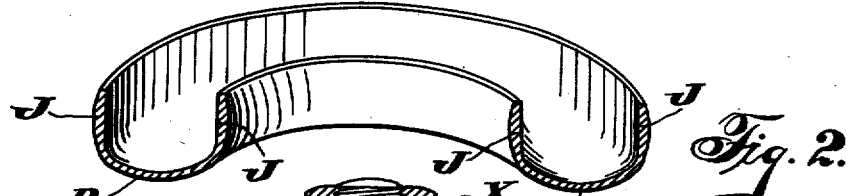
Figure 2 is a perspective view of the valve ring, partly in transverse section.

A spring or springs may be inserted between the guide ring and the valve, and in Figure 3 one suitable form of spring is shown comprising an annular plate R having spring fingers S suitably secured thereto as by means of the rivets T. This composite spring is inserted in the pocket between the guide ring and valve as shown in Figures 1 and 5, and acts as a spring cushion to cushion the valve on opening, and to some extents aids in guiding the valve. If desired, the guide ring may have the form shown at K' in Figures 6 and 7 and coiled springs U or flat springs V may be inserted in the sockets or grooves W in the guide ring. The springs may also be like that shown in Figure 8, formed of corrugated strips of metal, or else the springs may be omitted entirely as shown in Figure 9.

The annular pocket or chamber co-extensive with the area of the valve itself formed between the guide ring and the valve, constitutes a fluid cushion pocket in which the fluid is compressed as the valve opens. The fall of pressure in the pocket, due to leakage, also tends to cushion the valve as it seats. The provision for leakage may be made only at the clearance between the valve and the guide ring. If desired, a suitable outwardly opening relief valve which may be a spring pressed ball valve Y, as shown in Figure 10, may be inserted in the guide ring $K^2$. The pressure in the pocket, due to the lift of the valve, will be relieved when the pressure of the spring is exceeded, but as the ball valve Y closes inwardly, a strong so-called negative cushion is formed as the valve D closes. On the other hand, an inwardly opening spring pressed relief valve Z may be provided in the guide ring, $K^3$, as shown in Figure 11, so that a strong positive cushion is formed as the valve D opens and sufficient relief is afforded, as the valve D closes to prevent retardation of the valve. Ordinarily no valve similar to the valves Y and Z are necessary, but in order to enable the amount of fluid cushioning to be capable of adjustment if desired, an adjustable apertured plug $b$ may be provided in the guide ring $K^4$ as shown in Figure 9, moving about its own axis relative to the apertured disc $a$, and a lock washer $c$ holds the plug $b$ in adjusted position. By this means the leak port from the pocket may be varied in size.

It is to be understood that the drawings are merely illustrative and the form and construction of the valve and valve structure may be varied without departing from the invention covered by the claims appended hereto. While the valve is shown seating along a line contact on the seat, as the preferable construction approaching more nearly f w lines producing minimum resistance and a higher coefficient of flow, other forms of seating contact may be devised.

The outside contour of the valve or valves D, of which there may be any number desired, depending upon the size of the valve required, should conform approximately to the flow lines producing substantially parallel streams in the flow of the fluid, thus permitting the complete passage of fluid through the seat and around the valve with minimum change of direction and resistance and minimum loss, and permitting the maximum coefficient of flow to exist.

The contour of the entrance port or ports and outside surface of the exit port or ports, which may form part of the valve seat structure, should be such as to produce substantially parallel fluid streams with minimum change in direction and pressure loss, and the entire flow opening should approach as nearly as possible a condition in which internal air friction is substantially eliminated.

At least three forms of cushioning for the valve exist in this construction. The cushion pocket contained between the valve and its guide ring furnishes a means for obtaining fluid cushioning which will vary due to leakage between the surfaces of the valve and guide, through the clearance provided, or may be controlled to some extent by the modified forms of leak port valves shown and described.

If continuous leakage ports, or clearance space or spaces are provided, there will be leakage on the opening, due to increase of fluid pressure in the cushioning pocket, and there will be leakage into the cushion pocket on closing, due to the lowering of the pressure in the cushion pocket. At some intermediate point between the fully closed and fully open positions of the valve, the pressure in the cushion pocket will about equal external pressure and as the valve opens, the increase in the cushion pocket pressure will produce cushioning effect. On the other hand, as the valve closes, the external pressure will exceed the internal pressure, and cushioning effect will be produced because of the decrease in cushion pocket pressure.

The mechanical springs may be used or not, as desired and in fact springs may be used to assist the cushioning of the valve on closing if desired.

An additional fluid cushioning effect is obtained as hereinbefore pointed out, due to the change in velocity of the fluid as it passes from the throat of the seat through the lift or lift opening, which is generally defined as the minimum opening of the valve at which marked increase in velocity takes place through a Venturi tube. It will vary with different lifts which the valve may take due to the change in ratio between the area of the seat opening and the lift opening, so that the pressure drop through the minimum throat will vary. The pressure drop of varying amount has the effect of assisting the positive cushioning on the opening of the valve and causes the valve to float at a point at which there is minimum resistance to the passage of fluid for any set of conditions. As the valve approaches its seat on closing, the velocity of fluid is falling off, while the piston of the compressor or pump travelling in harmonic motion approaches rest at the end of the stroke, and the pressure at the throat is reduced, so that the negative cushion, due to the cushion pocket, has increased effect.

Since this improved valve is intended for use on reciprocating compressors or pumps in which the piston travel follows the law of harmonic motion, both the inlet and discharge valves are impelled to close at the end of the stroke when the piston is approximately at rest. The valve action involves the time element of opening and closing and the periods during which the valve remains open. Primarily this valve is designed for comparatively high rotative and piston speeds, under which conditions the following considerations apply and are of importance.

With a unit operating at a rotative speed of 400 R. P. M., the time required for one complete stroke of the piston is .075 seconds. If this unit is compressing air, single stage, to 100 pounds discharge pressure, the discharge valve will open, remain open, and close, in approximately 23% of the stroke provided adiabatic compression takes place, which is ordinarily the case. Therefore, the discharge valve will have to open, remain open, and close in about .01725 seconds. The actual period of time in which the valve must go through the operation of opening is approximately 2½% of the stroke, so that the time element for opening would be about .001875 seconds.

The approximate time in which the valve must effect complete closure is more difficult to ascertain, but is considerably longer than the time element of opening, due to the harmonic motion of the piston, since the valve starts to close as the piston approaches rest and the valve gradually comes to its seat.

These considerations emphasize the value of the combined air cushioning obtained from the cushion pocket and the cushioning due to the reduction of velocity through the throat relieving the unbalance of the valve at this point, so that the shock on closing is reduced by the total cushioning effect, and a material increase in the durable lift of the valve is permitted.

Because of the increased lift available, wider entrance ports are permitted up to the point at which the critical velocity of air through the throat is obtained, which will occur when the pressure at the throat under critical flow conditions will follow the law of flow through an adiabatic nozzle or Venturi tube. The pressure at the throat should, under critical flow conditions, equal .53 $P_1$ where $P_1$ is the entrance or initial pressure at the minimum section of the entrance nozzle or inlet. This critical flow condition or pressure ratio between the minimum throat and entrance, is the pressure ratio which if exceeded would create no greater flow through the valve, without increase in initial pressure $P_1$ and consequent increase in pressure drop. It is not to be taken for granted that this critical condition would exist under all conditions of operation. It, however, will be approached to a greater or less extent, depending upon the pressure differential, speed of operation in R. P. M., and total unit volume of fluid to be passed in a given time.

It will readily be seen that the critical condition of flow represents a direct relation of velocities in the entrance port and through the throat, and that with types of valves in which durable lift is restricted to a marked degree, the critical flow condition is reached and passed under comparatively moderate velocities through the entrance ports and thus the effective co-efficient of flow is materially limited and far below that for which the present invention is designed.

Furthermore, due to the increased lift and consequent increased ports permissible, the total available opening for the passage of fluid, for any given unit area in which the valve can be placed is proportionately increased. This has been shown by actual comparative tests and demonstration to vary from 25% to 40% increase in flow area depending upon the size and design of the valves compared. The co-efficient of flow, which is entirely independent of the above features, may be increased by a large percentage, altogether producing a largely increased capacity per unit area available for valves.

This invention produces a marked increase in the flow capacity or a marked increase in efficiency at the same rate of flow and this saving can be used either in obtaining higher efficiencies of operation or greater capacities per unit size at the same efficiency, or some increase in both at some mean or predetermined point.

I claim:

1. A multi-ported valve for fluid compressors, pumps or the like, comprising a valve seat, a stop plate, an annular valve, and an annular fluid cushioning chamber co-extensive with the valve in which fluid is adapted to be compressed for cushioning the opening of the valve.

2. A multi-ported valve for fluid compressors, pumps or the like, comprising a valve seat, a stop plate, an annular valve, and an annular fluid cushioning chamber for the valve co-extensive with the valve.

3. A multi-ported valve for fluid compressors, pumps or the like, comprising a valve seat, a stop plate, an annular valve, and an annular fluid cushioning chamber co-extensive with the valve for cushioning the closing of the valve.

4. A multi-ported valve for fluid compressors, pumps or the like, comprising a valve seat, a stop plate, an annular valve, and an annular fluid cushioning chamber co-extensive with the valve for cushioning both the opening and closing of the valve.

5. A multi-ported valve for fluid compressors, pumps or the like, comprising a valve seat, a stop plate, an annular valve, and an annular fluid cushioning pocket co-extensive with the valve between the valve and stop plate for cushioning the valve.

6. A multi-ported valve for fluid compressors, pumps or the like, comprising a valve seat, a stop plate, an annular valve, and an annular fluid cushioning pocket co-extensive with the valve located between the valve and stop plate for cushioning both the opening and closing of the valve.

7. A multi-ported valve for fluid compressors, pumps or the like, comprising a valve seat, a stop plate, an annular valve, and an annular fluid cushioning pocket formed within the valve between the valve and the stop plate co-extensive with the valve for cushioning the valve.

8. A multi-ported valve for fluid compressors, pumps or the like, comprising a valve seat, a stop plate in the form of a ring, an annular valve guided on the stop plate, an annular cushioning pocket in the valve, formed partly by the stop plate and co-extensive with the area of the valve for cushioning the valve, and means for permitting leakage of fluid out of and into said pocket.

9. A multi-ported valve for fluid compressors, pumps or the like, comprising a valve seat, a stop plate in the form of a ring, and an annular cup shaped valve guided on said stop plate, forming an annular cushioning pocket co-extensive with the valve between the valve and the stop plate.

10. A multi-ported valve for fluid compressors, pumps or the like, comprising a valve seat, a stop plate in the form of a ring, an annular cup shaped valve guided on said stop plate, forming an annular cushioning pocket co-extensive with the valve between the valve and the stop plate, and means for permitting leakage of fluid out of and into said pocket.

11. A multi-ported valve for fluid compressors, pumps or the like, comprising a valve seat, a stop plate, an annular valve, spring cushioning means for the valve and an annular fluid cushioning chamber for the valve, co-extensive with the valve, in which fluid is adapted to be compressed.

12. A multi-ported valve for fluid compressors, pumps or the like, comprising a valve seat having an annular entrance port formed with a minimum throat having rounded contours, an annular valve having rounded contours, a guide ring for the valve in the form of an annular cushioning pocket co-extensive with the valve, whereby the valve will lift to a point at which it will float with minimum resistance to the passage of fluid, and additional fluid cushioning means for the valve.

13. A multi-ported valve for fluid compressors, pumps or the like, comprising a valve seat having an annular entrance port formed with a minimum throat having rounded contours, an annular valve and a guide ring having rounded contours, whereby the valve is cushioned due to the increase in velocity of the fluid when passing the throat and consequent pressure reduction at this point, causing the valve to lift to a point at which it will float with minimum resistance to the passage of fluid, and additional fluid cushioning means for the valve in the form of an annular cushioning pocket co-extensive with the area of the valve.

14. A multi-ported valve for fluid compressors, pumps and the like, comprising a valve seat, a guide ring, and an annular valve, the valve seat, guide ring and valve being adapted to permit a continuous stream line flow of fluid entirely through the multi-ports of the valve, and an annular fluid cushioning chamber co-extensive with the area of the valve formed between the valve and guide ring.

15. A multi-ported valve for fluid compressors, pumps and the like, comprising a valve seat, a guide ring, and an annular valve, the valve seat, guide ring and valve being adapted to permit a continuous stream line flow of fluid entirely through the multi-ports of the valve, and fluid cushioning means co-extensive with the area of the valve for cushioning both the opening and closing of the valve.

16. A multi-ported valve for fluid compressors, pumps and the like, comprising a valve seat, a guide ring, and an annular valve, the valve seat, guide ring and valve being adapted to permit a continuous stream line flow of fluid entirely through the multi-ports of the valve, and fluid cushioning means co-extensive with the area of the valve for cushioning the closing of the valve.

17. A multi-ported valve for fluid compressors, pumps and the like, comprising a valve seat, a guide ring and an annular cup shaped valve cooperating with the guide ring to form an annular fluid cushioning pocket co-extensive with the area of the valve with provision for permitting leakage from said pocket, whereby the compression of fluid in the pocket as the valve moves toward the guide ring cushions the valve on opening, and the reduction of pressure in the pocket as the valve moves away from the guide ring cushions the valve on closing.

18. A multi-ported valve for fluid compressors, pumps and the like, comprising a valve seat, a guide ring and an annular cup shaped valve cooperating with the guide ring to form an annular fluid cushioning pocket co-extensive with the valve with provision for permitting leakage from said pocket, and means for varying said leakage, whereby the compression of fluid in the pocket as the valve moves toward the guide ring cushions the valve on opening, and the reduction of pressure in the pocket as the valve moves away from the guide ring cushions the valve on closing.

In testimony whereof I have signed this specification.

FREDERICK van DUZER LONGACRE.

ring to form an annular fluid cushioning pocket co-extensive with the valve with provision for permitting leakage from said pocket, and means for varying said leakage, whereby the compression of fluid in the pocket as the valve moves toward the guide ring cushions the valve on opening, and the reduction of pressure in the pocket as the valve moves away from the guide ring cushions the valve on closing.

In testimony whereof I have signed this specification.

FREDERICK van DUZER LONGACRE.

Certificate of Correction.

It is hereby certified that in Letters Patent No. 1,550,376, granted August 18, 1925, upon the application of Frederick van Duzer Longacre, of Yonkers, New York, for an improvement in "Valves," errors appear in the printed specification requiring correction as follows: Page 5, line 22, claim 7, after the word "plate" insert the word *and;* same page, lines 64 and 65, claim 12, strike out the phrase "in the form of an annular cushioning pocket co-extensive with the valve" and insert the same to follow after the word "valve" and before the period, line 69, same claim; and that the said Letters Patent should be read with these corrections therein that the same may conform to the record of the case in the Patent Office.

Signed and sealed this 22d day of September, A. D. 1925.

[SEAL.] KARL FENNING,
*Acting Commissioner of Patents.*

Certificate of Correction.

It is hereby certified that in Letters Patent No. 1,550,376, granted August 18, 1925, upon the application of Frederick van Duzer Longacre, of Yonkers, New York, for an improvement in "Valves," errors appear in the printed specification requiring correction as follows: Page 5, line 22, claim 7, after the word "plate" insert the word *and;* same page, lines 64 and 65, claim 12, strike out the phrase "in the form of an annular cushioning pocket co-extensive with the valve" and insert the same to follow after the word "valve" and before the period, line 69, same claim; and that the said Letters Patent should be read with these corrections therein that the same may conform to the record of the case in the Patent Office.

Signed and sealed this 22d day of September, A. D. 1925.

[SEAL.]
KARL FENNING,
*Acting Commissioner of Patents.*